(12) United States Patent
Shrivastava et al.

(10) Patent No.: US 9,749,816 B2
(45) Date of Patent: Aug. 29, 2017

(54) METHOD AND SYSTEM FOR DECODING MBSFN DATA

(71) Applicant: Samsung Electronics Co., Ltd., Gyeonggi-do (KR)

(72) Inventors: Vinay Kumar Shrivastava, Bangalore (IN); Raju Siddappa Udava, Bangalore (IN)

(73) Assignee: Samsung Electronics Co., Ltd (KR)

( * ) Notice: Subject to any disclaimer, the term of this patent is extended or adjusted under 35 U.S.C. 154(b) by 154 days.

(21) Appl. No.: 14/663,773

(22) Filed: Mar. 20, 2015

(65) Prior Publication Data

US 2016/0094955 A1    Mar. 31, 2016

(30) Foreign Application Priority Data

Sep. 25, 2014    (IN) .......................... 4700/CHE/2014

(51) Int. Cl.
*H04H 20/71*    (2008.01)
*H04W 4/06*    (2009.01)
*H04W 72/00*    (2009.01)

(52) U.S. Cl.
CPC ........... *H04W 4/06* (2013.01); *H04W 72/005* (2013.01)

(58) Field of Classification Search
None
See application file for complete search history.

(56) References Cited

U.S. PATENT DOCUMENTS

| 8,396,083 | B2 | 3/2013 | Maheshwari et al. | |
|---|---|---|---|---|
| 2013/0114492 | A1* | 5/2013 | Liu | H04L 1/0061 370/312 |
| 2013/0294318 | A1* | 11/2013 | Amerga | H04W 4/06 370/312 |
| 2013/0336173 | A1* | 12/2013 | Mandil | H04W 36/0072 370/280 |
| 2013/0336189 | A1* | 12/2013 | Mandil | H04L 12/189 370/312 |

FOREIGN PATENT DOCUMENTS

WO    WO 2011/020027    2/2011

\* cited by examiner

*Primary Examiner* — Chi H Pham
*Assistant Examiner* — Fahmida Chowdhury
(74) *Attorney, Agent, or Firm* — The Farrell Law Firm, P.C.

(57) ABSTRACT

A method of Physical Multicast Channel (PMCH) decoding for Multicast Broadcast Single Frequency Network (MBSFN) by a UE includes decoding a Transport Block (TB) in a first sub-frame of a Multicast Channel Scheduling Period (MSP) by a Physical (PHY) layer in the UE; providing the decoded TB to a Media Access Control (MAC) layer; performing blind decoding on all received MBSFN sub-frames, until the PHY layer receives PMCH scheduling configuration from the MAC layer; selecting at least one Logical Channel IDentifier (LCID) and Multicast Transport Channel (MTCH) scheduling information for each LCID by decoding a Multicast Channel Scheduling Information Protocol Data Unit (MSI PDU), the MSI PDU present in the decoded TB; building a PMCH scheduling configuration by the MAC layer based on the selected at least one LCID and the MTCH scheduling information; passing the PMCH scheduling configuration to the PHY layer by the MAC layer; and applying the PMCH scheduling configuration.

20 Claims, 7 Drawing Sheets

| | | |
|---|---|---|
| Oct 1 | LCID 1 | Stop MTCH 1 |
| Oct 2 | Stop MTCH 1 | |
| Oct 3 | LCID 2 | Stop MTCH 2 |
| Oct 4 | Stop MTCH 2 | |
| ⋮ | | |
| Oct 2n-1 | LCID n | Stop MTCH n |
| Oct 2n | Stop MTCH n | |

METHOD AND SYSTEM FOR DECODING MBSFN DATA

PRIORITY

This application claims priority under 35 U.S.C. §119(a) to an Indian Patent Application filed on Sep. 25, 2014 in the Indian Intellectual Property Office and assigned Serial No. 4700/CHE/2014, the entire contents of which are incorporated herein by reference.

BACKGROUND

1. Field of the Disclosure

The present disclosure relates to Long Term Evolution (LTE) based communication networks, and more particularly, to Multicast Broadcast Single Frequency Network (MBSFN) data in LTE based communication networks.

2. Description of the Related Art

MBSFN is a technique for providing content to users of a telecommunication network (which uses LTE, LTE Advanced or any other LTE based technology) for providing data to a User Equipment (UE) connected to the network, wherein the data can relate to television content and so on. LTE defines the use of two logical channels for use by MBSFN—a Multicast Control Channel (MCCH) and a Multicast Traffic Channel (MTCH). MCCH is used to transfer control information. MCCH carries a single message, the MBSFNAreaConfiguration message, which indicates the Multimedia Broadcast Multicast Service (MBMS) sessions that are ongoing as well as the corresponding radio resource configuration. MTCH is used to transfer MBMS data packets. User services that include streaming and downloading application services are mapped onto the MTCH. Both of these logical channels can be mapped to a single transport channel meant for multicast/broadcast traffic—Multicast Channel (MCH). MCH is further mapped to an MBSFN specific physical channel termed a Physical Multicast Channel (PMCH).

Sub-frames, which can be used for broadcast/multicast purposes, are termed MBSFN sub-frames. Information about these sub-frames and radio-frames are communicated using a System Information Block (SIB) Type 2, "MBSFN-sub-frameConfigList." Only sub-frames 1, 2, 3, 6, 7 and 8 can be used for an MBSFN in networks using Frequency Division Duplexing (FDD). For networks using Time Division Duplexing (TDD), sub-frames 3, 4, 7, 8 and 9 can be used for an MBSFN.

The UE can require additional information to identify the presence of MCCH and configurations required to acquire the same. This information is provided to the UE in a separate system information block dedicated for an MBMS (e.g. SIB-13), which carries information about all the MBSFN areas configured under a radio cell to which the UE is connected. On request from a higher layer, a Radio Resource Control (RRC) acquires an SIB-13 and checks if information related to an area of an MBSFN (in which the UE is interested) is present. If the information is present, the UE can further attempt to acquire MCCH information for that MBSFN area.

The UE should have the ability to support both unicast and MBSFN services efficiently and independently of each other. However, it is still difficult to provide unicast services without affecting MBSFN services and vice versa.

Currently, scheduling information is received in an MCH Scheduling Information (MSI) Protocol Data Unit (PDU) by a Media Access Control (MAC) layer. Since decoding is carried out at the PHYsical (PHY) layer, the MAC layer must decode, parse and segregate relevant scheduling information and pass it to the PHY. As the scheduling information is applicable immediately after the reception of the MSI PDU, there is a delay in the configuration of the PHY with the scheduling information and hence the PHY should be able to perform decoding without the scheduling information being configured.

Also, MCCH information is repeated within a stipulated window of time called a modification period. Further, the MCCH information can be provided (e.g. split) into more than one sub-frame. The UE must interpret successful decoding of an MCCH Service Data Unit (SDU) and avoid decoding across repetitions.

The MAC layer in the UE receives the scheduling information in an MSI PDU. The PDU includes the set of sub-frame information for the duration of the MTCH channels that carry MBSFN services. Since decoding is carried out at the PHY layer, the MAC layer must decode, parse and segregate relevant scheduling information pertaining to interested MTCH channels (e.g. services) and pass it to the PHY layer. The scheduling information is applicable immediately after the reception of the MSI PDU that means first MTCH channel data can be scheduled at the earliest time from the same sub-frame in which the MSI PDU is received. Therefore, configuration delay of the PHY with scheduling information, which certainly takes some finite amount of time, would be delayed.

SUMMARY

The present disclosure has been made to address the above-mentioned problems and disadvantages, and to provide at least the advantages described below. Accordingly, an aspect of the present disclosure provides a method and system for performing at least one decoding technique for MBSFN.

Another aspect of the present disclosure provides a method and system for performing reception of MBSFN data.

Another aspect of the present disclosure provides a method and system for configuring Physical Multicast Channel (PMCH) scheduling.

Another aspect of the present disclosure provides a method and system for efficient decoding of PMCH channels.

In accordance with an aspect of the present disclosure, a method of Physical Multicast Channel (PMCH) decoding for Multicast Broadcast Single Frequency Network (MBSFN) by a User Equipment (UE) in a wireless communication network is provided. The method includes decoding a Transport Block (TB) in a first sub-frame of a Multicast Channel Scheduling Period (MSP) by a Physical (PHY) layer in the UE; providing the decoded TB to a Media Access Control (MAC) layer in the UE by the PHY layer; performing blind decoding on all received MBSFN sub-frames by the PHY layer, until the PHY layer receives PMCH scheduling configuration from the MAC layer; selecting at least one Logical Channel IDentifier (LCID) and Multicast Transport Channel (MTCH) scheduling information for each of the at least one LCID by the MAC layer by decoding a Multicast Channel Scheduling Information Protocol Data Unit (MSI PDU), wherein the MSI PDU is present in the decoded TB; building a PMCH scheduling configuration by the MAC layer based on the selected at least one LCID and the MTCH scheduling information; passing the PMCH scheduling configuration to the PHY layer by the MAC layer; and applying the PMCH scheduling configuration by the PHY layer.

In accordance with another aspect of the present disclosure, a User Equipment (UE) configured to decode a Physical Multicast Channel (PMCH) for Multicast Broadcast Single Frequency Network (MBSFN), wherein the UE is connected to at least one wireless communication network is provided. The UE includes a Physical (PHY) layer and a Media Access Control (MAC) layer, wherein the PHY layer is configured to decode a Transport Block (TB) in a first sub-frame of a Multicast Channel Scheduling Period (MSP); provide the decoded TB to the MAC layer; perform blind decoding on all received MBSFN sub-frames until the PHY layer receives PMCH scheduling configuration from the MAC layer; wherein the MAC layer is configured to select at least one Logical Channel Identifier (LCID) and Multicast Transport Channel (MTCH) scheduling information for each of the at least one LCID by decoding a Multicast Channel Scheduling Information Protocol Data Unit (MSI PDU), wherein the MSI PDU is present in the decoded TB; build a PMCH scheduling configuration based on the selected at least one LCID and the MTCH scheduling information; passing the PMCH scheduling configuration to the PHY layer; and wherein the PHY layer is further configured to apply the PMCH scheduling configuration.

In accordance with another aspect of the present disclosure, a method for Multicast Control Channel (MCCH) decoding for Multicast Broadcast Single Frequency Network (MBSFN) by a User Equipment (UE) in a wireless communication network is provided. The method includes identifying a number of sub-frames and a number of occurrences of sub-frames that carry an MCCH message by a Physical (PHY) layer in the UE based on MCCH configuration information provided in System Information Block Type 13 (SIB13); decoding sub-frames for each decoding period by the PHY layer; upon detecting that decoding has failed, aborting decoding in a current repetition period by the PHY layer; decoding sub-frames in a next repetition period by the PHY layer; upon detecting that decoding is successful, stopping decoding in further repetition periods by the PHY layer; incrementing a decode success count by the PHY layer; and stopping decoding by the PHY layer upon detecting that the decode success count is equal to the number of sub-frames in the MCCH message.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figures 1, 2:
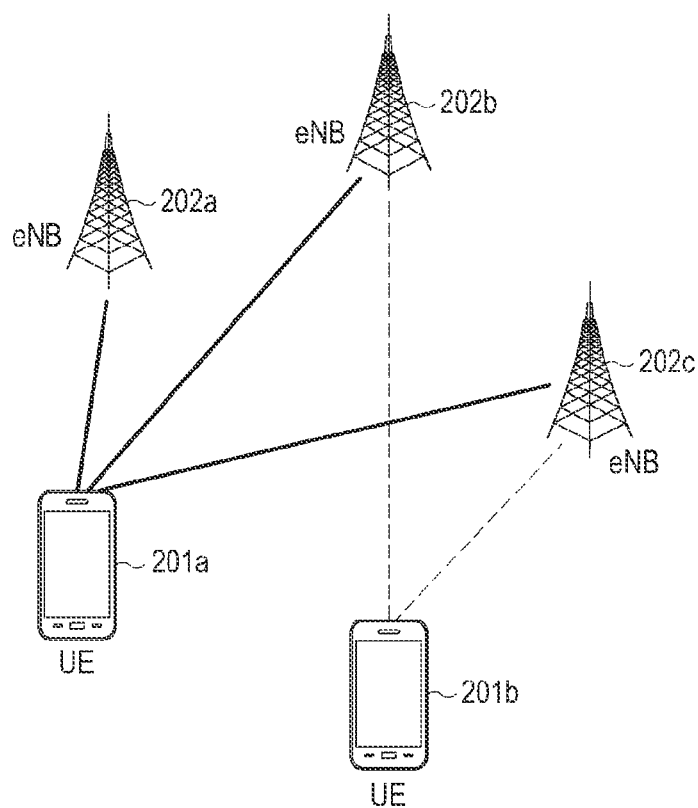
FIG. 1 illustrates an MSI PDU structure according to an embodiment of the present disclosure.
FIG. 2 illustrates an LTE network offering MBSFN according to an embodiment of the present disclosure.

The embodiments of the present disclosure herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments of the present disclosure. The examples used herein are intended merely to facilitate an understanding of ways in which the embodiments of the present disclosure can be practiced and to further enable those of skill in the art to practice the embodiments herein. Accordingly, the examples should not be construed as limiting the scope of the embodiments herein. Changes and modifications may be made within the scope of the embodiments of the present disclosure without departing from the scope and spirit thereof, which is defined by the appended claims and their equivalents. In the accompanying drawings, like reference letters indicate corresponding parts in the various figures.

The embodiments of the present disclosure herein achieve a method and system for performing at least one decoding technique for MBSFN. Referring to the drawings, and more particularly to FIGS. 1 through 7, where similar reference characters denote corresponding features consistently throughout the figures, there are shown embodiments of the present disclosure.

FIG. 1 illustrates an MSI PDU structure according to an embodiment of the present disclosure. The PDU includes a set of sub-frame information for the duration of the MTCH channels that carry MBSFN services. The PDU includes a Logical Channel IDentifier (LCID), wherein the LCID can be used to identify the MTCH channel to which the PDU belongs. The PDU also includes information related to the starting and ending of sub-frames of the MTCH channels scheduled for current PMCH.

FIG. 2 illustrates an LTE network offering MBSFN, according to an embodiment of the present disclosure. The network can be an LTE based communication network. The network can also use other communication technologies in conjunction with LTE. The network, as depicted, includes a plurality of evolved Node Bs (eNodeBs or eNBs) 202a, 202b, 202c and at least one UE 201a. The eNB 202a can offer MBSFN services to at least one UE 201a connected to the network. However, it is not necessary that all eNBs 202a, 202b, 202c present in the network be configured to offer MBSFN service(s). It is possible that not all MBSFN service(s) are configured on all the eNBs 202a, 202b, 202c. The UE 201a, 201b can be a device such as a mobile phone, a tablet personal computer (PC), a wearable computing device, a wireless communication dongle or any other device capable of connecting to an LTE based communication network.

Figure 3:
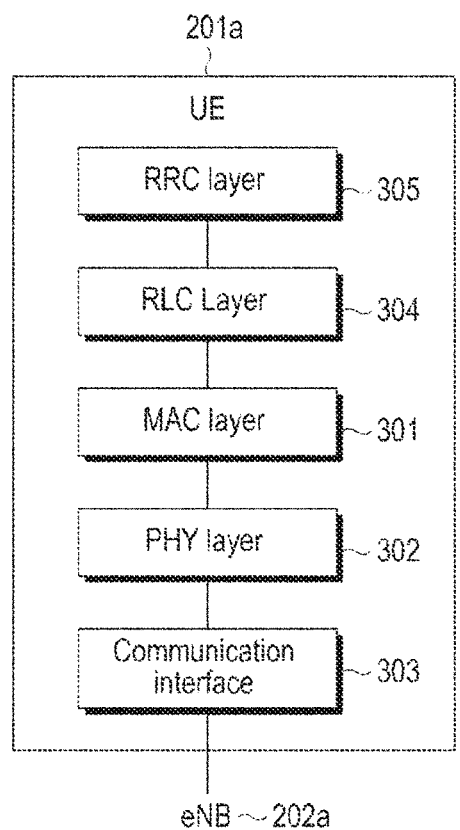
FIG. 3 is a block diagram of a UE according to an embodiment of the present disclosure.

FIG. 3 is a block diagram of a UE according to an embodiment of the present disclosure. The UE 201a, as depicted, includes a MAC layer 301, a PHY layer 302, at least one communication interface 303, an RLC layer 304 and an RRC layer 305. The communication interface 303 enables the UE 201a to connect to an LTE network. The communication interface 303 further enables the UE 201a to use an MBSFN service(s), as offered by the network. The UE 201a can further include at least one other communication interface, which enables the UE 201*a* to connect to other communication networks.

The PHY layer 302 enables data received via the communication interface 303 to be communicated to the MAC layer 301. The PHY layer 302 also enables data received from the MAC layer 301 to be communicated over the communication interface 303. The MAC layer 301 and the PHY layer 302 can communicate using a transport channel.

Figure 4A:
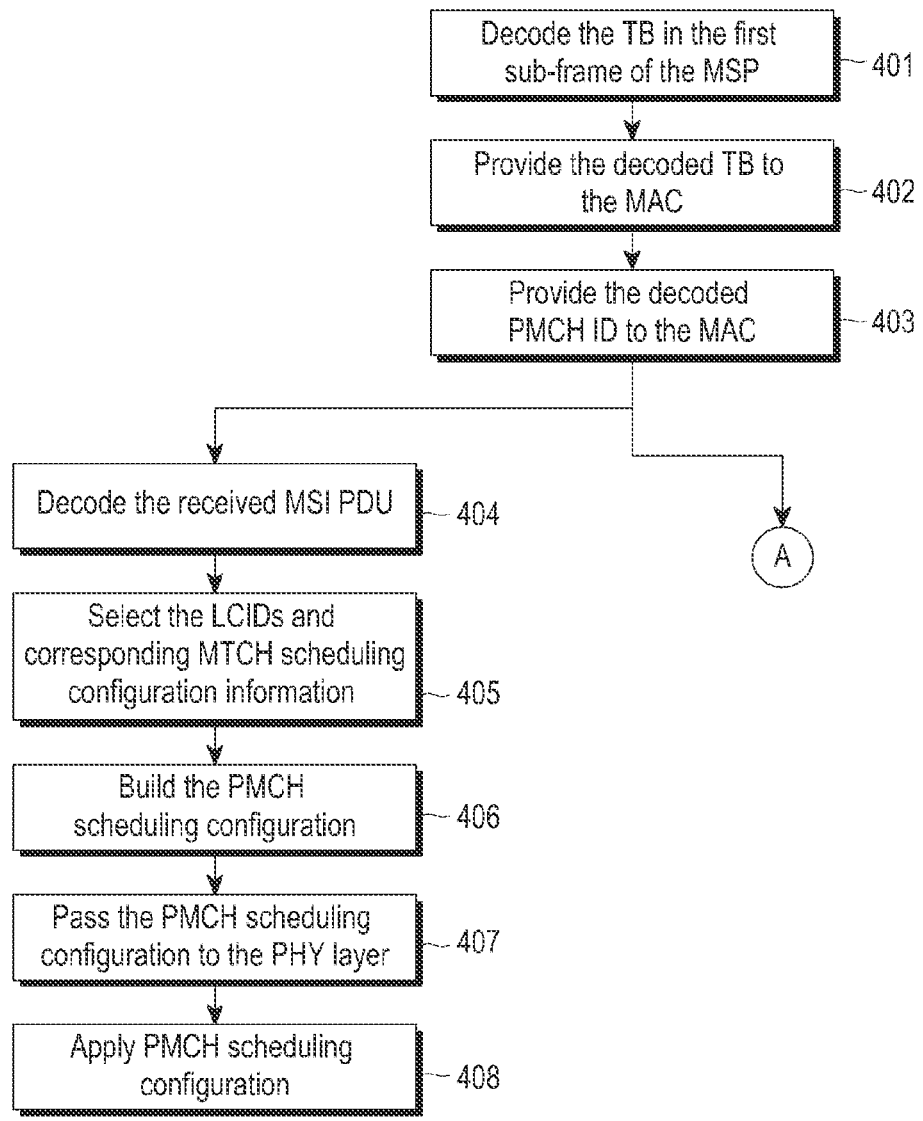
FIGS. 4A and 4B are flowcharts of a method of PMCH decoding for MBSFN in a UE according to an embodiment of the present disclosure.

FIG. 4A is a flowchart of a method of PMCH decoding for MBSFN in a UE according to an embodiment of the present disclosure. Upon receiving an MSI PDU via the communication interface 303, the PHY layer 302 decodes, in step 401, a Transport Block (TB) in a first sub-frame of an MCH Scheduling Period (MSP). The PHY layer 302 provides, in step 402, the decoded TB including the MSI PDU to the MAC layer 301 with a PMCH IDentification (PMCH ID). The PHY layer 302 further provides, in step 403, the PMCH ID as a serially incremented number in the order of PMCH configuration messages in the received MCCH message. The PMCH ID is provided to the PHY layer 302 while configuring a PMCH channel. The PHY layer 302 can use the PMCH ID to provide received data or MSI for the concerned PMCH channel. The MAC layer 301 decodes, in step 404, the received MSI PDU (from the TB). The MAC layer 301 selects, in step 405, the LCIDs and corresponding MTCH scheduling configuration information in the MSI PDU, based on the active services/channels being used in the UE. The MAC layer 301 can ignore scheduling information of other MTCH channels. Using the selected MTCH channel information, the MAC layer 301 builds, in step 406, the PMCH scheduling configuration and passes, in step 407, the PMCH scheduling configuration to the PHY layer 302. Upon the PHY layer 302 receiving the PMCH scheduling configuration from the MAC layer 301, the PHY layer 302 applies, in step 408, the scheduling configuration from the next sub-frame to be decoded.

Figure 4B:
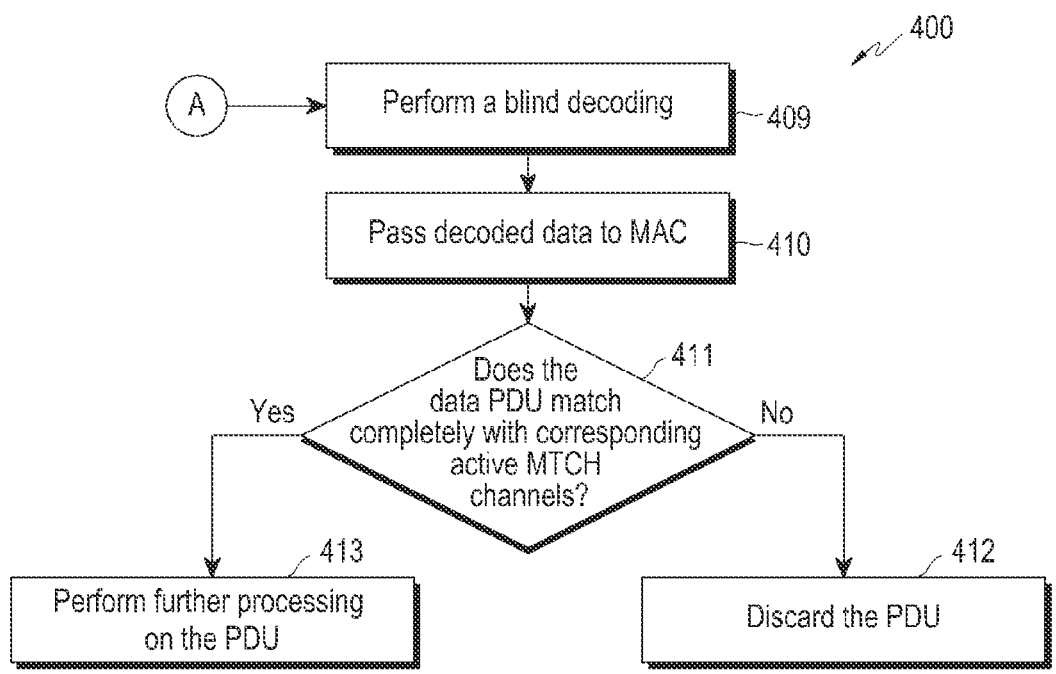

Until the PHY layer 302 receives the PMCH scheduling configuration from the MAC layer 301 and applies the PMCH scheduling configuration, the PHY layer 302 continues, in step 409 in FIG. 4B, doing a blind decoding for all the MBSFN sub-frames and passes, in step 410, the decoded data to the MAC layer 301. Discontinuous Reception (DRX) is delayed until the PMCH scheduling configuration is received and applied by the PHY layer 302. Upon receiving the decoded data from the PHY layer 302, the MAC layer 301 checks, in step 411, the PDU data for a match with corresponding active MTCH channels. If the PDU data for the corresponding active MTCH channels does not match completely, the MAC layer 301 discards, in step 412, the received PDU, depending on the level of matching. If the PDU data for the corresponding active MTCH channels does not match completely, the MAC layer 301 discards the received PDU completely. If the PDU data for the corresponding active MTCH channels does not partially match, the MAC layer 301 partially discards the received PDU. If the PDU data for the corresponding active MTCH channels completely matches, the MAC layer 301 performs, in step 413, further processing on the PDU.

In an embodiment of the present disclosure, the PHY layer 302 can maintain a fixed duration timer, which is started at the start of the MSP. Upon the expiration of the timer, the PHY layer 302 applies only the PMCH scheduling configuration and performs selective decoding of the PMCH channel.

In an embodiment of the present disclosure, the PHY layer 302 can define a number of sub-frames "N." The PHY layer 302 can perform selective decoding of the PMCH based on a scheduling configuration, after the N sub-frames are processed.

The steps in the method 400 may be performed in the order presented, in a different order or simultaneously. Further, in an embodiment of the present disclosure, some actions listed in FIGS. 4A and 4B may be omitted.

Figure 5:
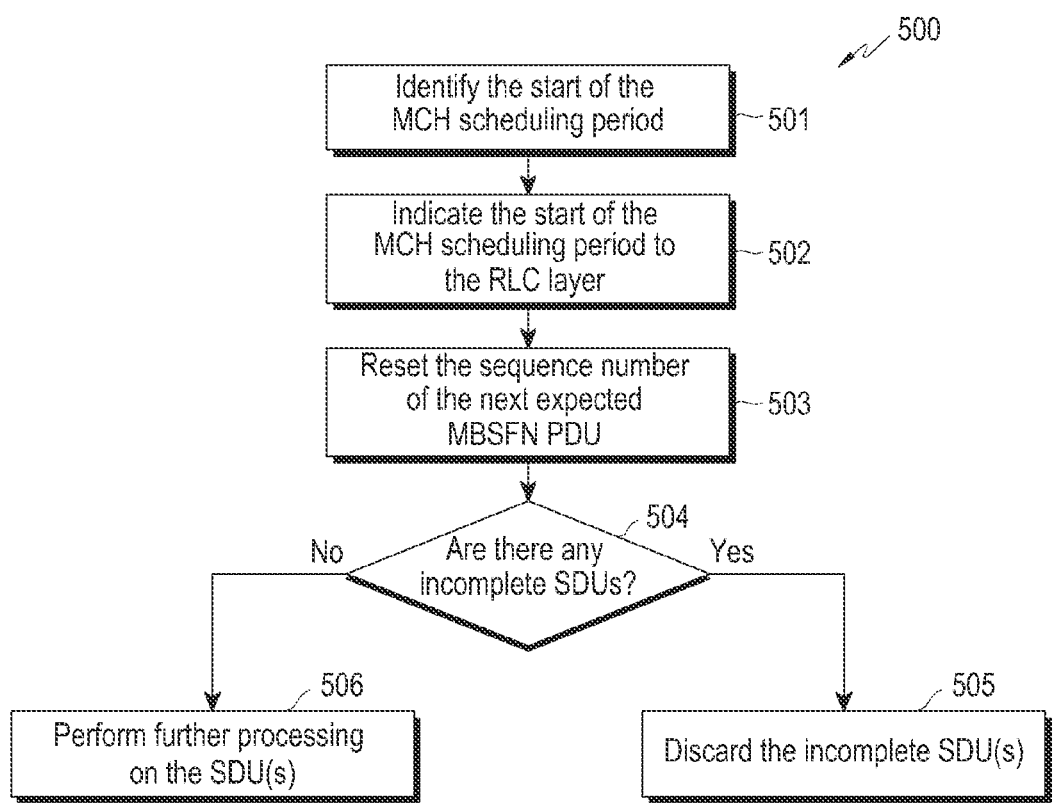
FIG. 5 is a flowchart of a method of resetting a Radio Link Control (RLC) sequence number by a MAC layer and an RLC layer according to an embodiment of the present disclosure.

FIG. 5 is a flowchart of a method of resetting an RLC sequence number by the MAC layer 301 and the RLC layer 304, according to an embodiment of the present disclosure. Upon receiving the MSI PDU, the MAC layer 301 identifies, in step 501, the start of the MCH scheduling period. Upon identifying the start of the MCH scheduling period, the MAC layer 301, in step 502, indicates the start of the MCH scheduling period to the RLC layer 304. The MAC layer 301 can use a suitable means such as an inter-layer primitive to communicate with the RLC layer 304. Based upon the indication received from the MAC layer 301, the RLC layer 304 resets, in step 503, the sequence number of the next expected MBSFN PDU for the MTCH channels (e.g. services) that are mapped to the PMCH for which MSI has been received. The RLC layer 304 further checks, in step 504, for incomplete SDUs for the MTCH channels. Upon detecting at least one incomplete SDU for the MTCH channels, the RLC layer 304 discards, in step 505, the incomplete SDUs. Upon detecting no incomplete SDUs for the MTCH channels, the RLC layer 304 performs, in step 506, processing on the SDUs. The various actions in method 500 may be performed in the order presented, in a different order or simultaneously. Further, in some embodiments, some actions listed in FIG. 5 may be omitted.

Figure 6:
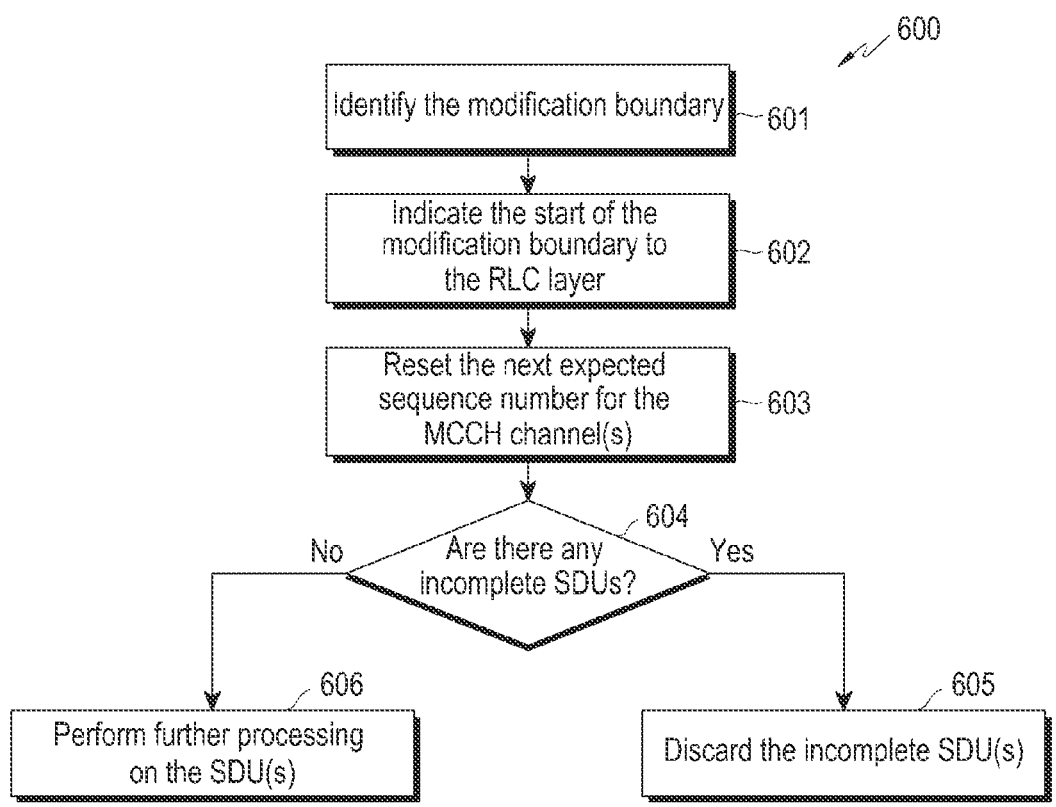
FIG. 6 is a flowchart of a method of resetting of an RLC sequence number by a PHY layer and an RLC layer according to an embodiment of the present disclosure.

FIG. 6 is a flowchart of a method of resetting an RLC sequence number by the PHY layer 302 and the RLC layer 304, according to an embodiment of the present disclosure. For the case of a modification boundary for the MCCH channel(s), the PHY layer 302 maintains the system timing and monitors the system timing. The PHY layer 302 identifies, in step 601, the modification boundary. The PHY layer 302 further indicates, in step 602, the start of the modification boundary to the RLC layer 304. The PHY layer 302 can communicate with the RLC layer 304 directly. The PITY layer 302 can communicate with the RLC layer 304 via the MAC layer 301. The RLC layer 304 resets, in step 603, the next expected sequence number for the MCCH channel(s). The RLC layer 304 further checks, in step 604, for incomplete SDUs for the MTCH channels. Upon detecting at least one incomplete SDU for the MTCH channels, the RLC layer 304 discards, in step 605, the incomplete SDUs. Upon detecting no incomplete SDUs for the MCCH channels, the RLC layer 304 performs (606) processing on the SDUs. The various actions in method 600 may be performed in the order presented, in a different order or simultaneously. Further, in some embodiments, some actions listed in FIG. 6 may be omitted.

Figure 7:
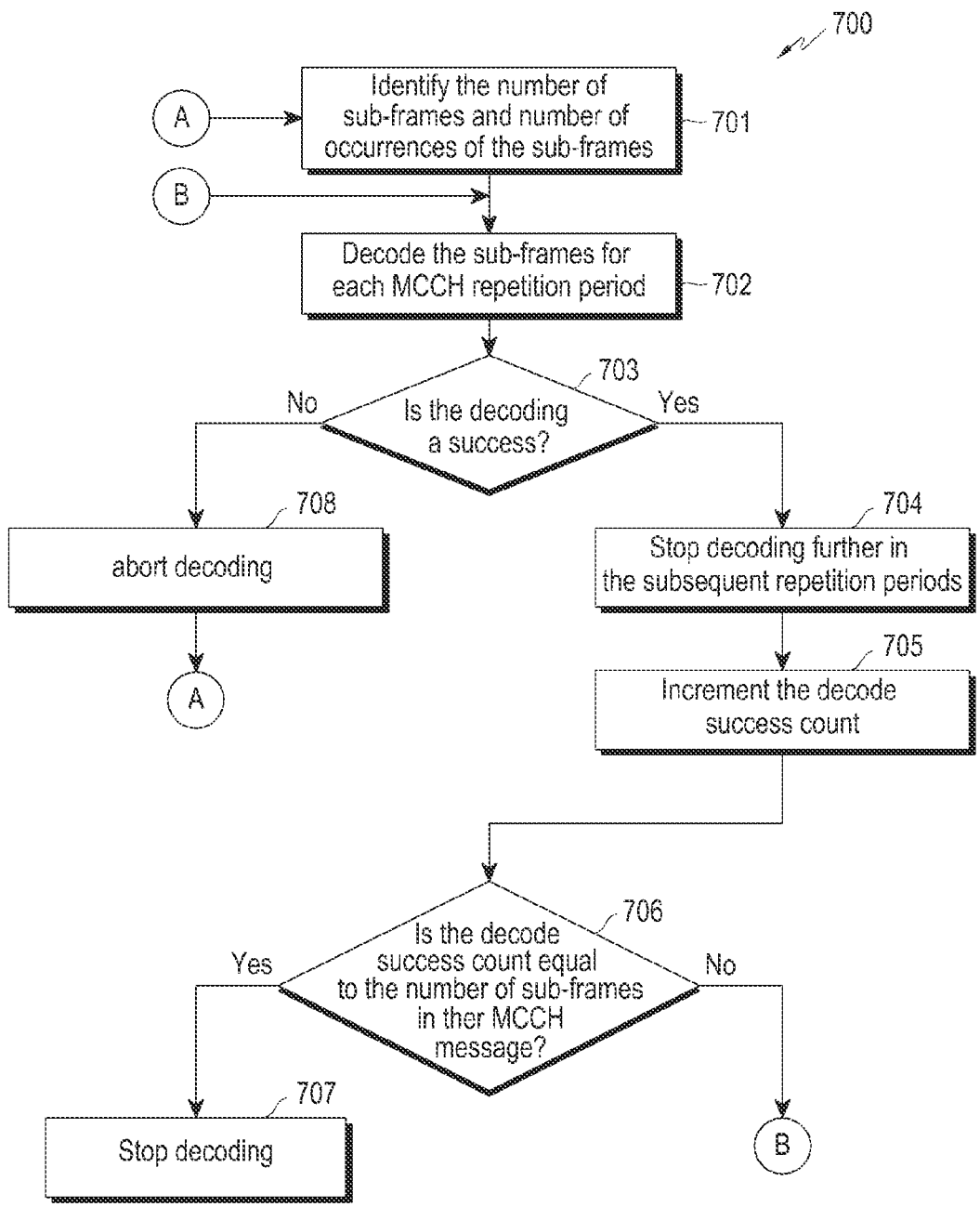
FIG. 7 is a flowchart of a method of MCCH decoding according to an embodiment of the present disclosure.

FIG. 7 is a flowchart of a method of MCCH decoding according to an embodiment of the present disclosure. The PHY layer 302 identifies, in step 701, the number of sub-frames and the number of occurrences of the sub-frames that carry an MCCH message with the MCCH configuration information provided in System Information Block Type 13 (SIB13). The PHY layer 302 decodes, in step 702, the sub-frames for each MCCH repetition period. The PHY layer 302 also maintains a decoding count to track the decoding success of the MCCH message across the sub-frames. The PHY layer 302 checks, in step 703, if decoding is successful. If decoding is successful for the MCCH message in all of its constituent sub-frames, the PHY layer 302 stops, in step 704, decoding further in the subsequent repetition periods. The PHY layer 302 increments, in step 705, the decode success count. The PHY layer 302 checks, in step 706, if the decode success count is equal to the number of sub-frames in the MCCH message. If the decode success count is equal to the number of sub-frames in the MCCH message, the PHY layer 302 stops, in step 707, further decoding. If the decode success count is not equal to the number of sub-frames in the MCCH message, the PHY layer 302 continues decoding. If decoding is not successful, the PHY layer 302 aborts decoding, in step 708, and the PHY layer 302 starts decoding in the next repetition period. The PHY layer 302 can also consider the possibility of the MCCH to be multiplexed with other signaling/data such as MSI, MTCH and so on before deciding upon discarding or stopping decoding the MCCH. The various steps in the method 700 may be performed in the order presented, in a different order or simultaneously. Further, in an embodiment of the present disclosure, some actions listed in FIG. 7 may be omitted.

In an embodiment of the present disclosure, the PHY layer 302 decodes all of the sub-frames of the MCCH message independently across all repetition periods. The PHY layer 302 sends the decoded sub-frame packets to the RLC layer 304. The RLC layer 304 checks for any duplicates and deletes any duplicate packets detected. Further the PHY layer 302 informs the start of the MCCH modification boundary and provides MBSFN area identification with each of the MCCH messages to the RLC layer 304.

In an embodiment of the present disclosure, a higher layer (for example, the RLC layer 304, the RRC layer 305 and so on) issues a decoding stop command to the PHY layer 302 when the layer receives the required MCCH message. In an example, the RLC layer 304 reassembles the MCCH message and sends the reassembled message and the MBSFN area identifier to the RRC layer 305. The RRC layer 305 then issues a decoding stop command to the PHY layer 302, indicating MBSFN area(s) for which the decoding must be stopped. The RRC layer 305 can indicate the MBSFN area(s) in the form of a list or a bitmap.

Embodiments of the present disclosure avoid unnecessary decoding operations and, thereby, reduce the battery power consumption of the UE 201a. Further in absence of Hybrid Automatic Repeat reQuest (HARQ) and Automatic Repeat reQuest (ARQ) functionality in MBSFN, the RLC layer 304 will discard incomplete MCCH SDUs. Stopping the decoding when decode is successful for all sub-frames of MCCH benefits power saving as the PHY layer 302 itself interprets completion of the operation.

The embodiments of the present disclosure can be implemented via at least one software program running on at least one hardware device and performing network management functions to control the elements. The elements shown in FIGS. 2 and 3 can be at least one of a hardware device, or a combination of a hardware device and a software module.

The foregoing description of the embodiments of the present disclosure describe the general nature of the embodiments herein so that others can, by applying current knowledge, readily modify and/or adapt for various applications such embodiments without departing from the scope and spirit of the present disclosure, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the present disclosure have been described in terms of certain embodiments, those skilled in the art will recognize that the embodiments herein can be practiced with modification within the spirit and scope of the present disclosure, which is defined by the appended claims and their equivalents.

What is claimed is:

1. A method of Physical Multicast Channel (PMCH) decoding for Multicast Broadcast Single Frequency Network (MBSFN) by a User Equipment (UE) in a wireless communication network, the method comprising:
    decoding a Transport Block (TB) in a first sub-frame of a Multicast Channel Scheduling Period (MSP) by a Physical (PHY) layer in the UE;
    providing the decoded TB to a Media Access Control (MAC) layer in the UE by the PHY layer;
    performing blind decoding on all received MBSFN sub-frames by the PHY layer, until the PHY layer receives PMCH scheduling configuration from the MAC layer;
    selecting at least one Logical Channel IDentifier (LCID) and Multicast Transport Channel (MTCH) scheduling information for each of the at least one LCID by the MAC layer by decoding a Multicast Channel Scheduling Information Protocol Data Unit (MSI PDU), wherein the MSI PDU is present in the decoded TB;
    building a PMCH scheduling configuration by the MAC layer based on the selected at least one LCID and the MTCH scheduling information;
    passing the PMCH scheduling configuration to the PHY layer by the MAC layer; and
    applying the PMCH scheduling configuration by the PHY layer.

2. The method, as claimed in claim 1, further comprising providing a PMCH Identification (PMCH ID) by the PHY layer to the MAC layer.

3. The method, as claimed in claim 1, wherein performing blind decoding further comprises:
    performing blind decoding on data in all received MBSFN sub-frames by the PHY layer;
    checking the decoded data by the MAC layer for a match with corresponding MTCH channels upon receiving the decoded data from the PHY layer; and
    discarding the decoded data by the MAC layer, if the decoded data does not completely match the corresponding MTCH channels.

4. The method, as claimed in claim 1, further comprising:
    maintaining a fixed duration timer by the PHY layer, wherein the fixed duration timer is started at a start of the MSP; and
    performing selective decoding by applying only PMCH scheduling configuration by the PHY layer upon expiration of the fixed duration timer.

5. The method, as claimed in claim 1, further comprising:
    defining a number of sub-frames N by the PHY layer, wherein the fixed duration timer is started at a start of the MSP; and
    performing selective decoding by applying only PMCH scheduling configuration by the PHY layer, after the number of sub-frames N are processed.

6. The method, as claimed in claim 1, wherein selecting at least one LCID and MTCH scheduling information for each of the at least one LCID by the MAC layer is based on at least one of active services and channels being used by the UE.

7. The method, as claimed in claim 1, further comprising: resetting a Radio Link Control (RLC) sequence number by indicating a start of the MSP by the MAC layer to an RLC layer upon the MAC layer identifying of the start of the MSP;

resetting a sequence number of a next expected MBSFN PDU for MTCH channels that are mapped to PMCH for which MSI has been received by the RLC layer; and discarding at least one incomplete Service Data Unit (SDU) by the RLC layer upon the RLC layer detecting the at least one incomplete SDU for the MTCH channels.

8. The method, as claimed in claim 1, further comprising: resetting a Radio Link Control (RLC) sequence number by indicating a start of a modification boundary by the PHY layer to an RLC layer, on the PHY layer identifying the modification boundary, wherein the PHY layer maintains and monitors system timing related to the UE;

resetting a sequence number of a next expected MBSFN PDU for Multicast Control Channels (MCCHs) for which the start of the modification boundary has been received by the RLC layer; and discarding at least one incomplete Service Data Unit (SDU) by the RLC layer upon the RLC layer detecting the at least one incomplete SDU for the MCCH channels.

9. A User Equipment (UE) configured to decode a Physical Multicast Channel (PMCH) for Multicast Broadcast Single Frequency Network (MBSFN), comprising:

at least one communication interface capable of being connected to at least one wireless communication network; and one or more processors capable of implementing a Physical (PHY) layer and a Media Access Control (MAC) layer, wherein the PHY layer is configured to:
decode a Transport Block (TB) in a first sub-frame of a Multicast Channel Scheduling Period (MSP);
provide the decoded TB to the MAC layer; and
perform blind decoding on all received MBSFN sub-frames until the PHY layer receives PMCH scheduling configuration from the MAC layer;

wherein the MAC layer is configured to:
select at least one Logical Channel Identifier (LCID) and Multicast Transport Channel (MTCH) scheduling information for each of the at least one LCID by decoding a Multicast Channel Scheduling Information Protocol Data Unit (MSI PDU), wherein the MSI PDU is present in the decoded TB;
build a PMCH scheduling configuration based on the selected at least one LCID and the MTCH scheduling information; and
pass the PMCH scheduling configuration to the PHY layer; and wherein the PHY layer is further configured to:
apply the PMCH scheduling configuration.

10. The UE, as claimed in claim 9, wherein the PHY layer is further configured to:
provide a PMCH identification (PMCH ID) to the MAC layer.

11. The UE, as claimed in claim 9, wherein the UE is configured to perform blind decoding by:
configuring the PHY layer to:
perform blind decoding on data in all received MBSFN sub-frames; and
configure the MAC layer to check the decoded data layer for a match with corresponding MTCH channels upon receiving the decoded data from the PHY layer; and discard the decoded data if the decoded data does not completely match with the corresponding MTCH channels.

12. The UE, as claimed in claim 9, wherein the PHY layer is further configured to:
maintain a fixed duration timer, wherein the fixed duration timer is started at a start of the MSP; and
perform selective decoding by applying only the PMCH scheduling configuration upon expiration of the fixed duration timer.

13. The UE, as claimed in claim 9, wherein the PHY layer is further configured to:
define a number of sub-frames N, wherein the fixed duration timer is started at a start of the MSP; and
perform selective decoding by applying only the PMCH scheduling configuration, after the number of sub-frames N are processed.

14. The UE, as claimed in claim 9, wherein the MAC layer is further configured to:
select at least one LCID and MTCH scheduling information for each of the at least one LCID based upon at least one of active services and channels being used by the UE.

15. The UE, as claimed in claim 9, wherein the UE is further configured to reset a Radio Link Control (RLC) sequence number by:
configuring the MAC layer to:
indicate a start of the MSP to an RLC layer upon the MAC layer identifying start of the MSP; and
configuring the RLC layer to:
reset a sequence number of a next expected MBSFN PDU for MTCH channels that are mapped to PMCH for which MSI has been received; and
discard at least one incomplete Service Data Unit (SDU) upon the RLC layer detecting the at least one incomplete SDU for the MTCH channels.

16. The UE, as claimed in claim 9, wherein the UE is further configured to reset a Radio Link Control (RLC) sequence number by:
configuring the PHY layer to:
indicate a start of a modification boundary to the RLC layer upon the PHY layer identifying the modification boundary, wherein the PHY layer is further configured to maintain and monitor system timing related to the UE; and
configuring the RLC layer to:
reset a sequence number of a next expected MBSFN PDU for Multicast Control Channels (MCCHs) for which the start of the modification boundary has been received; and
discard at least one incomplete Service Data Unit (SDU) upon the RLC layer detecting the at least one incomplete SDU for the MCCH channels.

17. A method for Multicast Control Channel (MCCH) decoding for Multicast Broadcast Single Frequency Network (MBSFN) by a User Equipment (UE) in a wireless communication network, the method comprising:
identifying a number of sub-frames and a number of occurrences of sub-frames that carry an MCCH message by a Physical (PHY) layer in the UE based on MCCH configuration information provided in System Information Block Type 13 (SIB13);
decoding sub-frames for each decoding period by the PHY layer;
upon detecting that decoding has failed, aborting decoding in a current repetition period by the PHY layer;

decoding sub-frames in a next repetition period by the PHY layer;

upon detecting that decoding is successful, stopping decoding in further repetition periods by the PHY layer and incrementing a decode success count by the PHY layer; and stopping decoding by the PHY layer upon detecting that the decode success count is equal to the number of sub-frames in the MCCH message.

18. The method, as claimed in claim 17, wherein the MCCH message is multiplexed with at least one signal and data.

19. The method, as claimed in claim 17, further comprising:

decoding all sub-frames of the MCCH message independently across all repetition periods by the PHY layer; and deleting any duplicates among the decoded sub-frames by a Radio Link Control (RLC) layer upon the RLC layer receiving the decoded sub-frames from the PHY layer.

20. The method, as claimed in claim 17, further comprising:

providing an indication, by at least one higher layer in the UE, to stop decoding of at least one MBSFN area to the PHY layer upon the at least one higher layer receiving the MCCH message.

* * * * *